United States Patent

[11] 3,609,230

[72] Inventors Thomas O. Paine
Administrator of the National Aeronautics and Space Administration with respect to an invention of;
James W. Wood, Milpitas, Calif.

[21] Appl. No. 739,391
[22] Filed June 24, 1968
[45] Patented Sept. 28, 1971

[54] BROADBAND VIDEO PROCESS WITH VERY HIGH INPUT IMPEDANCE
2 Claims, 3 Drawing Figs.

[52] U.S. Cl. ........ 178/7.1, 330/11, 330/35
[51] Int. Cl. ........ H04n 5/16, H03f 3/16
[50] Field of Search ........ 307/205; 330/35, 11, 38; 178/7.1 R, 7.2 R, DIG. 26

[56] References Cited

UNITED STATES PATENTS

| | | | |
|---|---|---|---|
| 3,396,236 | 8/1968 | Foster | 178/7.1 |
| 3,452,287 | 6/1969 | Busch et al. | 330/35 |
| 3,102,163 | 8/1963 | Sennhenn | 178/7.2 |
| 3,217,100 | 11/1965 | Voeckler | 178/7.1 DC |

OTHER REFERENCES

Field Effect Transistors, Amelco Semiconductor, No. 1, June 1962.

*Primary Examiner*—Robert L. Griffin
*Assistant Examiner*—John C. Martin
*Attorneys*—Monte F. Mott, J. H. Warden and G. T. McCoy

ABSTRACT: A broadband video processor is disclosed. It includes a very-high-input impedance stage which incorporates a field effect transistor. The processor is relatively immune to ambient noise. Also, the high impedance enables the use of a small input capacitor which accounts for fast DC restoring.

JAMES W. WOOD
*INVENTOR.*

BY [signature]

ATTORNEYS

JAMES W. WOOD
*INVENTOR.*

BY

ATTORNEYS

BROADBAND VIDEO PROCESS WITH VERY HIGH INPUT IMPEDANCE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457). BACKGROUND OF THE INVENTION 1. Field of the Invention This invention generally relates to a video circuitry and, more particularly, to a high input impedance video processor with high noise immunity.

2. Description of the Prior Art

At present nearly all known video processors use a high-impedance amplifier to perform DC restoring. The use of such a n amplifier is the main reason for the processor's high susceptibility to ambient radiation noise, which is highly undesirable. Another disadvantage of the use of such an amplifier is the limited maximum input impedance which it provides, necessitating the use of a relatively large coupling capacitor. As a result, DC restoring often requires more time than desirable or tolerable. A need therefore exists for a new input arrangement for a video processor, which provides higher immunity to ambient noise and one which would allow DC restoring in less time than herebefore attainable.

OBJECTS AND SUMMARY OF THE INVENTION

A primary object of the present invention is to provide a new video processor.

Another object of the invention is the provision of a new input arrangement for a video processor.

A further object of the invention is to provide a video processor with high immunity to ambient noise.

Still a further object of the invention is the provision of a video processor with very high input impedance with which DC restoring is accomplished in less time than required by prior art circuits.

These and other objects are achieved by the use of a field effect transistor (FET) in the processor's input circuit. The FET provides very high input impedance, higher than realizable with prior art high impedance amplifiers. Such high input impedance distributed over a much smaller area of circuitry and inherent shielding greatly reduces the processor's susceptibility to ambient noise. Also, due the FET's high input impedance, a smaller coupling capacitor can be used. Consequently, DC restoring can be accomplished in less time than required by prior art arrangements.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
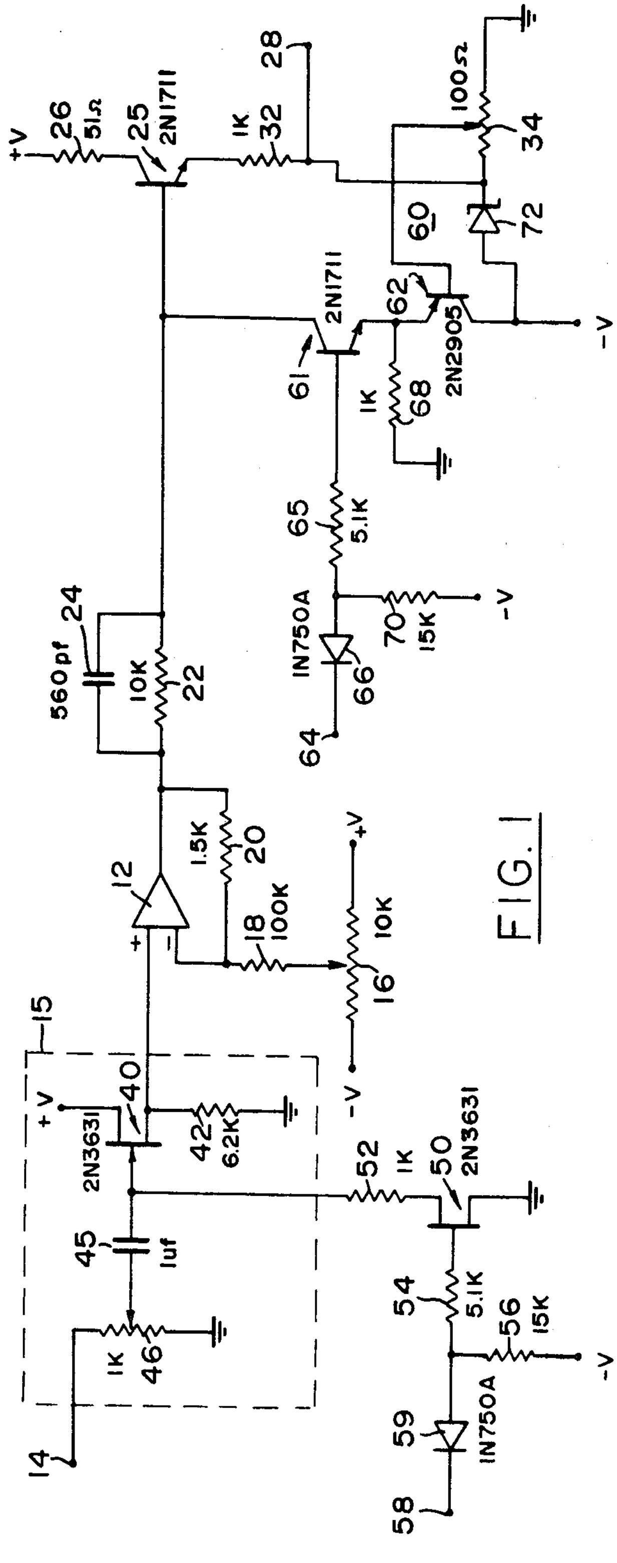
FIG. 1 is a schematic diagram of one embodiment of the invention.

Attention is now directed to FIG. 1 which is a schematic diagram of one embodiment of the video processor of the invention. It includes a differential amplifier 12. One input of the amplifier is connected to an input terminal 14 through an input stage 15. Video signals are assumed to be supplied to input terminal 14 from an appropriate source.

The other input of amplifier 12 is connected to the arm of a variable resistor 116 through a resistor 18. Resistor 16 is connected between positive and negative potential sources, such as +V and −V. The output of amplifier 12 is connected through a resistor 20 to resistor 18 and through another resistor 22, shunted by a capacitor 24, to the base of a transistor 25. The latter, connected as an emitter follower, acts as the output stage, having its collector connected through a resistor 26 to +V. The emitter is connected to an output terminal 28 and to a reference potential, such as ground, through serially connected resistors 32 and 34.

In order to provide the video processor with a very high input impedance without susceptibility to ambient noise, in accordance with the teachings of the present invention, the input stage 15 incorporates a field-effect-transistor (FET) 40, having its source electrode connected to +V. Its drain electrode is connected to ground through a resistor 42 and to the first input of the amplifier 12. The gate electrode of FET 40 is connected, through an input capacitor 45, to the moving arm of a variable resistor 46. The latter has one end connected to input terminal 14 and the other end is connected to ground.

It has been discovered that the use of the FET provides a very high input impedance without the disadvantages of processor susceptance to ambient noise. Also, the impedance provided by the FET is very high, such as 80 megohms, so that a relatively small size capacitor 45 may be used. Thus, DC restoring is achievable in proportionally less time than when a larger capacitor is used, which is the case in the prior art when a high impedance amplifier is used.

To provide the processor with a reference black level, the processor shown in FIG. 1 includes a second FET 50 with its source electrode connected to the gate of FET 40 through a resistor 52. The drain electrode is connected to ground, while the gate electrode is connected to −V through resistors 54 and 56. The junction point of the two resistors is connected to an input terminal 58 through a diode 59.

By applying a damping pulse of about +6 VDC volts and 0.070 ms. duration, the FET 50 is turned on and clamps the video signal between capacitor 45 and the gate of FET 50 to ground, through resistor 52. It is assumed that the timing of this pulse has been established to occur during a time period, when the video is at a known level, such as "Back porch," "-Front Porch" or a selected mark, which is designed into the vidicon for this purpose. All errors in the transmitting, receiving or detection equipment which would cause the video gray level to be in error, are stored in capacitor 45 in the form of a DC charge during this time, so that, after removing the pulse, the video signal may be processed free of these errors.

As is appreciated by those familiar with video processing, video information is often combined with sync signals, during which video information is not present. In order to prevent the processor from responding to ambient noise during the absence of video, a blanking circuit or arrangement is used to blank or inhibit the processor's operation during the duration of each sync signal.

In the processor shown in FIG. 1, this is accomplished by a blanking stage 60 shown including a pair of transistors 61 and 62. The base of transistor 61 is connected to an input terminal 64 through serially connected resistor 65 and diode 66, while the collector of 61 is connected to the base of output transistor 25. The emitters of 61 and 62 are tied together, and through a resistor 68 to ground, while the junction point of 65 and 66 is connected to −V through a resistor 70. The collector 62 is connected to −V and to a Zener diode 72 which is connected to the junction point between resistors 32 and 34. The base of transistor 62 is connected to the arm of variable resistor 34.

Briefly, to inhibit or blank the processor during each sync signal, which is applied to terminal 64, transistors 61 and 62 are enable so that the base of transistor 25 is effectively at −V potential. As a result, transistor 25 is disabled.

One particular embodiment of the circuit of FIG. 1 was actually reduced to practice with components of the following types and values.

Amplifier 12 Fairchild M709

FET 40 2N 3631

FET 50 2N 3631

Transistor 25 2N1711
Transistor 60 2N1711
Transistor 62 2N2905
Zener 72 1N3021
Capacitor 45 luf
Capacitor 24 560 pf
Zener Diode 59 1N750A
Zener Diode 66 1N750 A
Resistor 16 10KΩ
Resistor 18 100KΩ
Resistor 20 1.5kΩ
Resistor 22 10KΩ
Resistor 26 51Ω
Resistor 32 1KΩ
Resistor 34 100Ω
Resistor 42 6.2KΩ
Resistor 46 1KΩ
Resistor 52 1KΩ
Resistor 54 5.1KΩ
Resistor 56 15KΩ
Resistor 65 5.1KΩ
Resistor 68 1KΩ
Resistor 70 1.5KΩ

Figure 2:
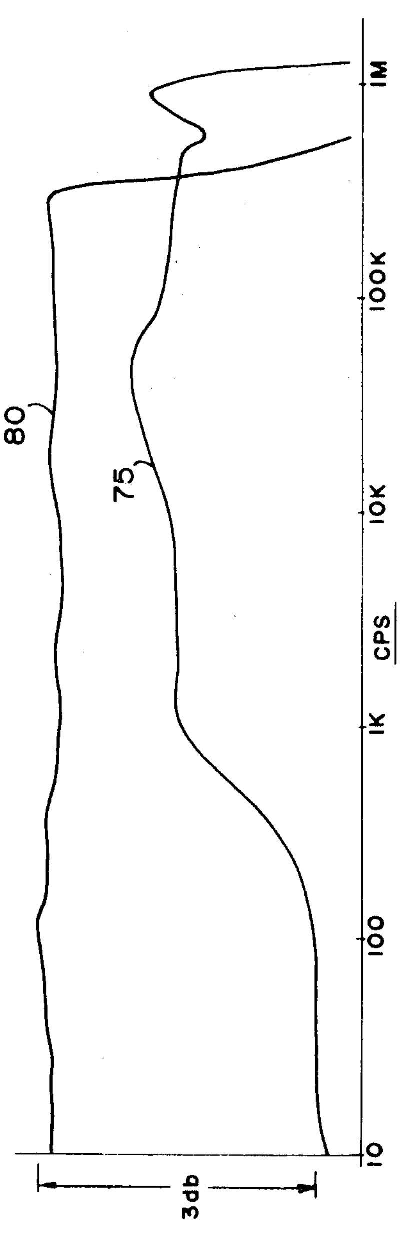
FIG. 2 is a diagram f frequency versus amplitude of the processor of the invention.

The amplitude versus frequency response of the embodiment is shown in FIG. 2 to which reference is made herein. As seen therefrom he response of the FIG. 1 circuit, represented by line 75, is relatively uniform over a very wide frequency band.

Figure 3:
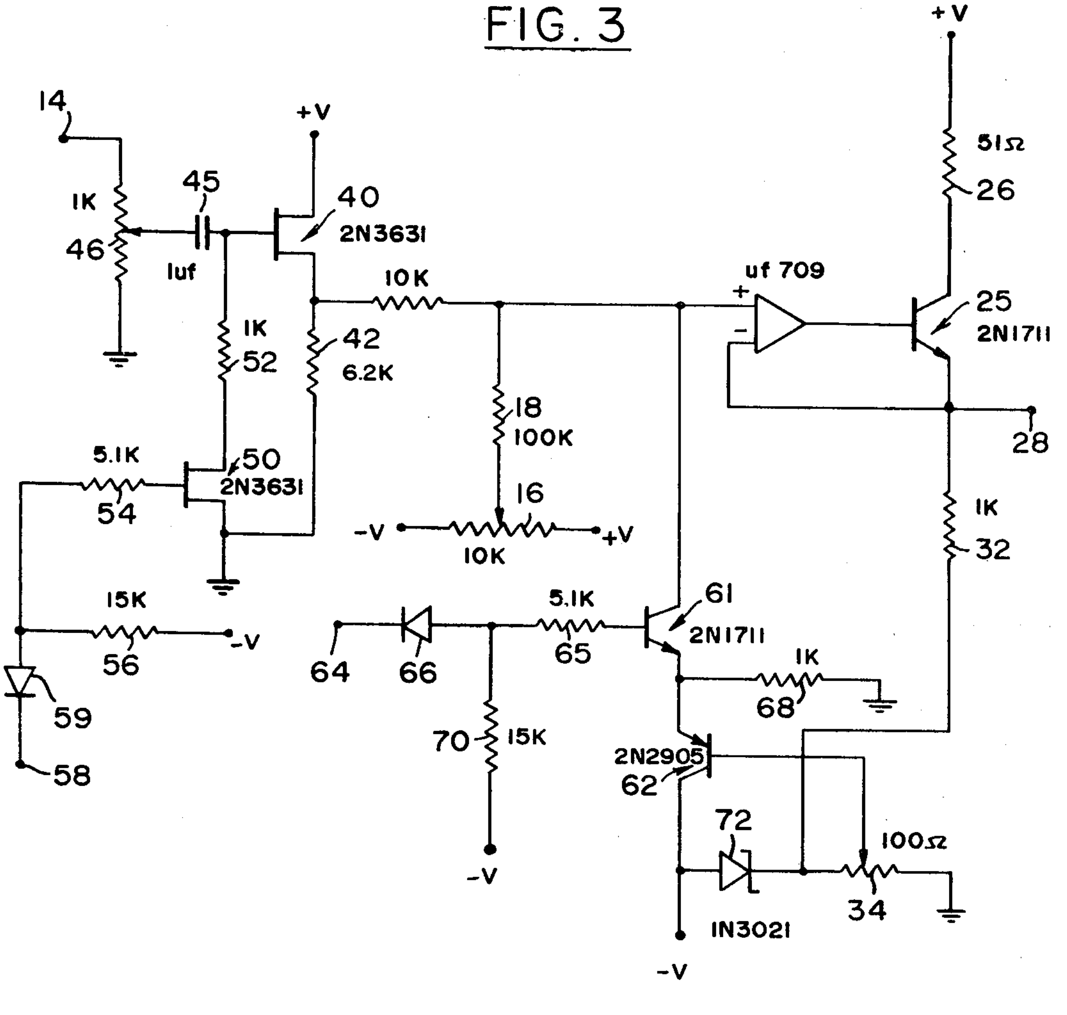
FIG. 3 is a schematic diagram of another embodiment of the invention.

Attention is now directed to FIG. 3 which is a second embodiment of the processor of the invention, in which like elements are represented by like numerals. In this embodiment, the FET 40 and small valued capacitor 45 are also included in the input stage to provide the advantages of the invention. The major difference between embodiments shown in FIGS. 1 and 3 is represented by the connection of the blanking circuit to one of the amplifier's inputs, rather than to the output transistor. Also, in the embodiment of FIG. 3, the output of the processor is fed back as one input of amplifier 12. The frequency response of this embodiment is represented in FIG. 2 by line 80.

By comparing lines 75 and 80 it is apparent that Whereas the bandwidth of the embodiment of FIG. 3 is narrower, than that of the embodiment of FIG. 1, the response is more linear. Indeed measured values indicate a response error of less than 0.02 db.

Although particular embodiments of the invention have been described and illustrated herein, it is recognized that modifications and variations may readily occur to those skilled in the art and consequently it is intended that the claims be interpreted to cover such modifications and equivalents.

I claim:

1.

A video processor comprising:

a differential amplifier having first and second inputs and an output;

output means including an output terminal connected to said amplifier output; means for providing a reference signal to said second amplifier input;

input means including an input terminal to which video signals are supplied, connected to said amplifier first input, said input means including a first field effect transistor, a first resistor coupled to said input terminal, and a relatively small capacitor connected to said first resistor and to said field effect transistor for reducing direct-current restoring time;

means including a second field effect transistor and a second resistor connected in series between a reference potential and the junction point between said capacitor and said first field effect transistor for selectively coupling said junction point through said second resistor to said reference potential when said second field effect transistor is in a conductive state;

blanking means responsive to sync signals for inhibiting the supply of a signal to said output terminal; and said output means including a transistor with base, collector and emitter electrodes connected as an emitter follower, having its base connected to said amplifier output and its emitter to said output terminal, and means connecting said blanking means to the amplifier first input and means connecting the amplifier second input to said emitter electrode.

2. In a video processor of the type to which video signals and sync signals are applied at first and second input terminals, respectively, an arrangement comprising:

a differential amplifier with first and second inputs and an output;

an output transistor having base, emitter and collector electrodes;

means for connecting said base electrode of said output transistor to the amplifier output, the collector electrode of said output transistor to a first reference potential and said emitter electrode of said output transistor to said amplifier second input and to a second reference potential;

sync signal responsive means for selectively coupling said amplifier first input to a third reference potential;

bias means for establishing a bias potential at said amplifier first input;

a first resistor connected between the processor's first input terminal and said second reference potential;

a first field effect transistor having base, drain and source electrodes, a capacitor;

means for connecting said capacitor between said first resistor and the base electrode of said first field effect transistor;

means for connecting said source electrode to said first reference potential;

means for connecting said drain electrode to said amplifier first input and to said second reference potential, whereby said first field effect transistor provides a high input impedance and the capacitance of said capacitor is minimized to reduce direct-current restoring time; and control means coupled to said base electrode of said first field effect transistor for selectively coupling said base electrode and the capacitor coupled thereto to said second reference potential, said control means include a second field effect transistor.